US009289018B2

(12) United States Patent
De Mattei et al.

(10) Patent No.: US 9,289,018 B2
(45) Date of Patent: Mar. 22, 2016

(54) INTERACTIVE POINT OF PURCHASE SYSTEM

(75) Inventors: Mark Anthony De Mattei, Greensboro, GA (US); Solomon Emeth, Los Angeles, CA (US)

(73) Assignee: TCB ENCORE, LLC, Greensboro, GA (US)

( * ) Notice: Subject to any disclaimer, the term of this patent is extended or adjusted under 35 U.S.C. 154(b) by 1018 days.

(21) Appl. No.: 13/354,012

(22) Filed: Jan. 19, 2012

(65) Prior Publication Data

US 2012/0204307 A1 Aug. 16, 2012

Related U.S. Application Data

(60) Provisional application No. 61/434,080, filed on Jan. 19, 2011.

(51) Int. Cl.
| | |
|---|---|
| *A41D 1/00* | (2006.01) |
| *G09F 21/02* | (2006.01) |
| *G09F 27/00* | (2006.01) |
| *G06F 1/16* | (2006.01) |
| *A41D 27/08* | (2006.01) |
| *G09F 9/33* | (2006.01) |
| *G09F 9/35* | (2006.01) |

(52) U.S. Cl.
CPC ................ *A41D 1/002* (2013.01); *G06F 1/163* (2013.01); *G09F 21/026* (2013.01); *G09F 27/00* (2013.01); *A41D 27/085* (2013.01); *G09F 9/33* (2013.01); *G09F 9/35* (2013.01); *G09F 2021/023* (2013.01)

(58) Field of Classification Search
None
See application file for complete search history.

(56) References Cited

U.S. PATENT DOCUMENTS

| | | | |
|---|---|---|---|
| 4,710,981 A | 12/1987 | Sanchez | |
| 5,953,757 A | 9/1999 | Blanks | |
| 6,057,966 A * | 5/2000 | Carroll et al. | 359/630 |
| 6,377,228 B1 * | 4/2002 | Jenkin et al. | 345/1.3 |
| 7,571,495 B2 | 8/2009 | Emeth | |
| 2001/0043164 A1 | 11/2001 | Thagard et al. | |
| 2002/0054174 A1 * | 5/2002 | Abbott | G06F 1/163 715/863 |
| 2003/0030839 A1 * | 2/2003 | Walters et al. | 358/1.15 |
| 2003/0107580 A1 * | 6/2003 | Egawa et al. | 345/582 |
| 2004/0012569 A1 * | 1/2004 | Hara | 345/169 |
| 2005/0111174 A1 * | 5/2005 | Jordan | 361/681 |
| 2005/0209868 A1 * | 9/2005 | Wan | G06F 17/2795 705/345 |
| 2005/0264543 A1 * | 12/2005 | Gorischek | 345/204 |
| 2006/0059600 A1 | 3/2006 | Emeth | |

(Continued)

FOREIGN PATENT DOCUMENTS

| | | |
|---|---|---|
| JP | 2001/032105 A | 2/2001 |
| JP | 2009280946 A * | 12/2009 |

OTHER PUBLICATIONS

International Search Report and Written Opinion of PCT/US2012/021908, completed on Aug. 29, 2012.

*Primary Examiner* — Maurice L McDowell, Jr.
(74) *Attorney, Agent, or Firm* — Smith Risley Tempel Santos LLC; Gregory Scott Smith

(57) ABSTRACT

The system includes a garment having a series of electronic components affixed to a new or existing panel of said garment, which garment includes a flexible video display screen mounted on a portion of the garment outer surface and may contain a series of video cameras, communication systems, audio and video input and output devices, computer chips and transmission devices. A power generation system affixed to the garment or garment panel supplies the energy for its display.

21 Claims, 6 Drawing Sheets

(56) References Cited

U.S. PATENT DOCUMENTS

2006/0241792 A1* 10/2006 Pretlove et al. ................. 700/83
2008/0014989 A1* 1/2008 Sandegard et al. ........... 455/557
2008/0180352 A1* 7/2008 Modir et al. ...................... 345/8
2010/0004977 A1* 1/2010 Marci .................... G06Q 30/02
 705/7.32
2010/0036717 A1* 2/2010 Trest ............................ 705/14.1
2010/0051689 A1* 3/2010 Diamond ....................... 235/380
2010/0275267 A1* 10/2010 Walker et al. ................... 726/26

* cited by examiner

INTERACTIVE POINT OF PURCHASE SYSTEM

BACKGROUND OF THE INVENTION

1. Field of the Invention

The invention relates to garments, and, more particularly, a garment having a removable billboard panel having indicia thereon and interactive features associated with the garment.

2. Description of Related Art

In U.S. Pat. No. 7,571,495, there is described a garment having a detachable billboard panel on the front or back, or both, having indicia thereon for advertising a movie or sporting event or the like, an entertainment program, etc. The billboard panel is a removable panel that is quickly and easily mounted to or removed from the garment and flaps on the garment cover the securing elements.

Conventional billboard-type garments have been modeled after a traditional garment with the ability to "switch" a panel on the garment, as in U.S. Pat. No. 7,571,495, to display one-dimensional indicia. Designs that depart from this basic fluid-dynamic design, even if excessively attractive, are seldom implemented because they tend to require the user to switch each printed panel manually which limits the speed to instantaneously deliver content with efficiency and controllability. Additionally, conventional billboard-type garments tend to require a substantial amount of service providers to manage the manual switching of the printing panels.

Conventional billboard-type garments carry printed advertising signage, sometimes illuminated from within. For example, some billboard-type garments have networks of lights attached to the back of their panels, which can display text and simple images. However, these networks of lights only cover a small portion of the surface of the billboard-type garment panel.

BRIEF SUMMARY OF THE INVENTION

It is an object of this invention to provide interactive features to a billboard-type garment.

The above-identified problems are solved and a technical advance is achieved in the art by the Interactive Point Of Purchase System™ (iPOPS™) of the present invention. An iPOPS™ is a fully integrated video, audio, incoming and outgoing electronic data delivery transmission and communication system that works in succession with Cloud Computing Technology (CCT) and includes a full color, full-motion removable video display, a full motion, full-color light emitting diode (LED) video display, full-color organic light emitting diode (OLED) video display, electronic paper (E-PAPER), Chroma-Key Technology or any combination thereof; or any other display mechanism.

In certain embodiments, the iPOPS™ may contain elements of Visual Recognition Communication which includes and is not limited to mediated or augmented reality components connected to wireless device(s) possessed by a viewer. The iPOPS™ may also include broadcast, video cameras, input and output devices, computers, computer atom chips, frictionless transaction communication transmitters, transceivers, holographic imagery projectors and communication systems. The iPOPS™ may also include chroma-key technology to project indicia on the garment that may be viewable from an interactive wearable head-mounted eyepiece with an integrated processor for handling content for display and an integrated image source for introducing the content to an optical assembly through which the user views a surrounding environment and garment indicia through the displayed content in the eyepiece. The iPOPS™ may also include a microphone plug-in jack or wireless transmitter for real-time listening, Bluetooth Technology or any open wireless technology standard for exchanging data over short distances (using short wavelength radio transmissions in the ISM band), earphone plug-in jack for live interaction or recorded communication from a database (that may or may not be connected or used in conjunction with the wearable head-mounted eyepiece), a wireless communication device (such as a mobile phone) that may or may not be connected to the iPOPS™ Interactive Video Display Panel™ and in certain embodiments may access a virtual attendant that can provide "real-time" answers to consumer or garment wearer questions; either live or accessed through a Cloud based database source, video camera and/or video or atom chip technology and may include a GPS tracking identification device. The iPOPS™ may also include power receiving contacts for the automatic charging and re-charging of accompanied on-garment electronic components for use with an electronic garment charging system. The information processes are provided through an iPOPS™ Cloud based or computing network.

An Interactive Point Of Purchase System™ (iPOPS™) is comprised of a series of electronic components affixed to a billboard-type garment. An iPOPS™ may feature electronic wireless transmissions of an advertisement, event, promotion or any indicia that is received by the iPOPS™ system and broadcast simultaneously or is stored in and delivered from the iPOPS™ Cloud Server to the iPOPS™ billboard-type garment panel or video panel display. An audio portion of the event video broadcast transmission may be transmitted directly to the panel transmitter(s) and embedded speakers or to wireless device(s), which convert the signal to analog, digital or any other frequency for transmission to wireless receiver devices possessed by billboard-type garment wearing users within certain proximity of the retail store, event or promotion. The content of the electronically transferred video, data and the broadcast audio may be live or pre-recorded.

An existing billboard-type garment may be equipped with broadcast video cameras, satellite transceiver equipment, satellite antennae, microwave transceiver equipment, microwave antennae, computers, electronic video input and output devices, and a full motion, full-color light emitting diode (LED) video display, full-color organic light emitting diode (OLED) video display, electronic paper (E-PAPER) or a combination of; or any other display device attached to the iPOPS™ Garment.

DETAILED DESCRIPTION OF THE INVENTION

Figure 1:
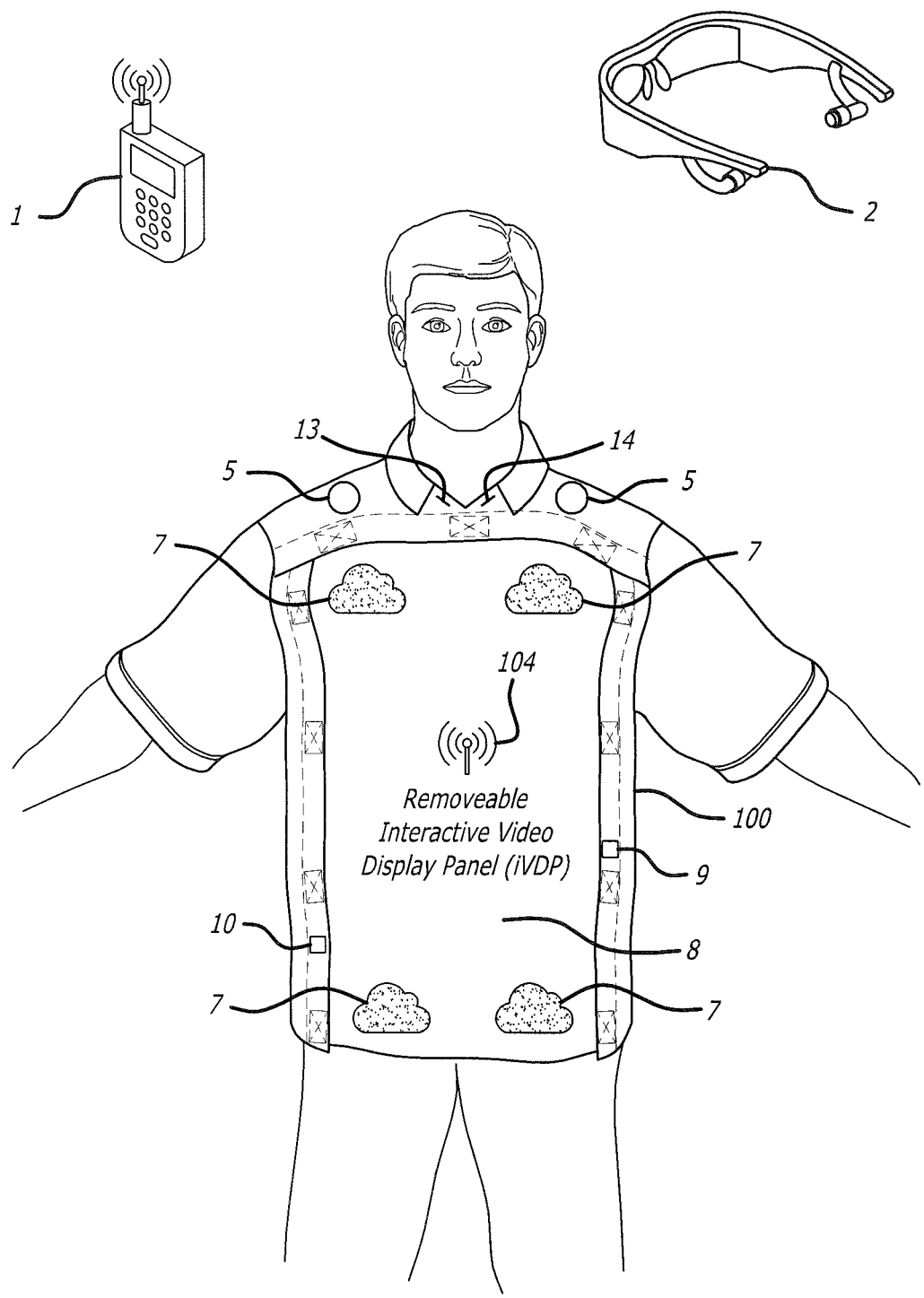
FIG. 1 is an elevational view of the front of an interactive garment in accordance with the teachings of the invention.

As can be seen in FIG. 1, an interactive billboard-type garment is shown capable of indoor and outdoor day and night display and capable of transmitting or receiving audio or visual content either directly applied to the garment or through Visual Recognition Communication cloud connected devices which may include mediated or augmented reality head-mounted eyepiece components. The equipment may be equipped with video cameras, microphones, speakers, satellite transceiver equipment, GPS (global positioning system) equipment, incoming and outgoing wireless communication devices, chroma-key technology components and radio transmission equipment. In some embodiments, the iPOPS™ content may be distributed remotely through Cloud based transmissions or on-site through hard-wired electronic devices.

An iPOPS™ video display surface is a radiant, full-color or black and white video screen, which is visible both at day and at night and is capable of displaying both still and motion picture imagery or a combination of both. In a preferred embodiment, the video screen is implemented by covering an iPOPS™ video display with black and white pixels to millions of red, green, and blue light-emitting diodes (or a combination thereof), which are computer controlled. In certain embodiments, the billboard-type garment may provide stereoscopic 2D to multi-dimensional (3D, 4D . . . etc) images to viewers who may be wearing head-mounted stereoscopic liquid crystal or multi-dimensional Augmented Reality (AR) glasses or utilizing handheld mobile devices to access additional content as are known in the art. In some cases, iPOPS™ radio transmission equipment may be used to provide the necessary synchronization signal to such head-mounted liquid crystal or mediated or augmented reality eyepiece connected to wireless mobile device(s) to access additional content displayed through the head-mounted eyepiece or a combination thereof as are known in the art.

Under certain circumstances, an iPOPS™ may provide audio as well as video. Audio programming may be delivered to viewers by an iPOPS™ in a number of ways. For example, audio may be delivered via an iPOPS™'s on-garment speaker system. As another example, an iPOPS™ may use its radio transmission equipment to transmit analog or digital audio information from the iPOPS™ audio system to a non-garment wearing consumer's mobile device through wireless transmission communication. Such transmitted audio information may be received, for example, by portable receiver units, mobile devices (such as mobile phones or tablets) and/or wearable head-mounted mediated or augmented reality eyepiece hardware connected to a wireless device(s) possessed by a billboard-type garment wearer or any combination of these components.

Audio/video programming for an iPOPS™ may be provided in a number of ways. For example, content may be stored on mass storage situated on a local site or through a Cloud based computer system. Alternately, content may be transmitted wirelessly to an iPOPS™ via satellite and/or conventional radio frequency and/or wireless transmission signals or any combination thereof. The programming may originate from a studio where artists and/or other individuals generate and coordinate the imagery or audio content that is shown or heard on an iPOPS™. The studio is ideally equipped with powerful graphical workstations running advanced creative software such as Maya, Final Cut Pro, Avid, Montage, Adobe Photoshop or any other audio or video production software as known in the art. In some embodiments, the artists and/or other individuals may blend into the content images and sounds received via an iPOPS™ embedded garment camera(s). Under certain circumstances, advertisements may be placed upon an iPOPS™ by the studio. In other embodiments, multiple locations may broadcast the same live or pre-recorded audio and/or video content simultaneously creating a simulcast event which may include employee training videos, concerts, instant replays or any other content or indicia that may be broadcasted.

The website and/or mobile application (App), depending on the embodiment, may play a number of roles in the operation of an iPOPS™. As noted above, the website and/or mobile application (App) may be used for the submission of artwork to be incorporated into an iPOPS™'s content. Software for creating such submissions may be downloadable from the website and/or mobile application (App). The website and/or mobile application (App) may also be used to provide web or app users with real-time views captured by an iPOPS™'s camera(s) and/or with the content currently being delivered by an iPOPS™. For example, when an iPOPS™ is in a retail outlet, web and/or mobile application (App) users may see live views in the retail location and hear live sounds captured by an iPOPS™'s cameras and built-in microphones. The web and/or mobile application (App) users might also be able to choose to hear and see the audio and video being delivered from the iPOPS™ to the people in the retail location, concert, sporting event or any other indoor or outdoor environments which includes live or pre-recorded audio and/or video simulcast event broadcasting.

An operational day for an iPOPS™ billboard-type garment is now given by way of example. In the morning, an employee shows up to work and retrieves his/her fully charged iPOPS™ billboard-type garment from an Electronic Garment Charging System that holds a freshly cleaned and pressed iPOPS™ Garment provided by a iPOPS™ licensed or designated industrial laundry service provider. Simultaneously, the iPOPS™ Interactive Video Display Panel™, RFID Tag, Atom Chip Sound System, Data and Mobile Device Communication System, Eyepiece, Earpiece, Gaming Transmitter, Near Field Communication Device, Smell Disseminator, GPS Location System and Holographic Projector and Wearable Eyepiece with wireless Sound Device and Microphone are activated by the iPOPS™ control team, either located on-site or from a remote location, which maintains constant communication with the iPOPS™ billboard-type garment(s). The control team, computers and communication equipment monitor each of iPOPS™'s users. The iPOPS™'s billboard-type garment user could travel throughout a retail store displaying content. At some point, the iPOPS™ can change the content on the iVDP™ as the electronic transmitters are communicating with the iVDP™ to change its video content based on pre-determined transmitters located throughout the retailer or may display simulcasted broadcasts from the iPOPS™ Control Team's Cloud Based or other computer network or through wearable head-mounted augmented reality eyepiece hardware connected to wireless handheld devices possessed by viewers, or a combination of these components. Consumers can interact with the iPOPS™ by using a mobile wireless device (including but not limited to a head mounted eyepiece) that can be activated by QR Codes (Mobile Action Codes) that are displayed on the iVDP allowing consumers to receive text messages, coupons, internet website links, entry into contests or any other electronic proposition the iPOPS™ system may deliver. The iPOPS™ will collect critical consumer data via the iPOPS™ electronic data collection transfer to later use to engage with iPOPS™ customers or third party vendors utilizing their hard-wired or wireless devices at its discretion. The iPOPS™ will also include an opt-in signature from the consumer allowing the iPOPS™ network to engage with the consumer at a time in the future as is standard in the industry. As the employee travels throughout the store, the smell disseminator may release the "bread in the oven" smell as the employee travels near the bakery section or a "fresh Irish Spring Soap" scent may be disseminated as the employee travels through the Men's Health and Beauty aisle of the store, enticing consumers to purchase products that are in the vicinity of the scents. As a consumer approaches an employee wearing an iPOPS™ Garment and/or Eyepiece, and the on-garment or Eyepiece microphone picks up a question asked by the consumer and the Data Communication System relays the question back to the iPOPS™ Network and relays the answer back to the employee who then tells the consumer the answer to their question which all happens in a matter of seconds. The employee may see the answer to the consumer via the Eyepiece Heads Up Display (HUD) and may also give GPS mapping directions to a specific product location in the store. In addition, the employee may look at a barcode (Data Matrix Code or Multi Dimensional Code or Tag) and the Eyepiece Code (or Tag) Reader can display product information, pricing or access the Data Communication System to access additional specifics about the item being viewed by the eyepiece. As the Consumer walks by the employee they wave their mobile device near the employee and instantly receive customer loyalty points, are entered into a contest or receive coupons delivered straight to their wireless device that relate to the advertisement being displayed on the iPOPS™ Interactive Video Display Panel™ or for a product that was discussed with the employee that was answered through the iPOPS™ Data Communication System. Store security has no problems identifying their employees from consumers due to the GPS Locator device installed in the iPOPS™ Garment and it is easy to track their movements and break periods throughout the day while they are on-premise. Consumers may also be invited to play a game for rewards such as a Scavenger Hunt while they are in-store based on different propositions that may appear on the iPOPS™ Interactive Video Display Panel™. As an employee walks down an aisle, the Atom Chip installed in the iPOPS™ Garment can identify from one to many consumers by age, race and nationality and the iPOPS™ Interactive Video Display Panel™ can instantly switch an advertisement to meet the exact demographics of the consumers who are looking at the iPOPS™ Interactive Video Display Panel™. The Data Communication may collect the generalized data and process the number of consumers, the captured data (age, gender and nationality), time of viewing, what content was viewed and generate real-time dashboard Vitalytics™ reports via the iPOPS™ Network and charge advertisers based on the content provided. A consumer may walk down an aisle and see an employee wearing an iPOPS™ Garment displaying a multi-dimensional Holographic Image within close proximity of the employee which could ask and answer questions from a consumer or play a full-motion advertisement or video content with audio being broadcast by the embedded speakers in the employee iPOPS™ Garment or wirelessly transmitted to a consumer's wireless device, Earpiece or Eyepiece capable of receiving audio and/or video content.

It can be seen that there is disclosed an interactive point of purchase billboard-type garment system. The invention comprises the addition of Interactive Mobile Action Code technology (MAC), to the billboard-type garment that includes and is not limited to:

Wireless delivery of electronic transmission of smartcodes or one to many dimensional coded images inclusive and not limited to Data Matrix, QR-Quick Response, EYELEVEL INTERACTIVE™ Codes "EI™ Codes", CloudTAG™ Technology Codes, Aztec Codes or any version of a Mobile Action Code (MAC) or multi dimensional code or tag, or visual search results utilizing pictures to identify objects. Response including but not limited to electronic data, images, video or any other electronic information to a wireless device (handheld, head-mounted eyepiece, affixed to a body or embedded into a garment or garment panel, or human being flesh that is delivered by capturing a dimensional image code or visual search code that initiates communication with a wireless communication device whether delivered by a one or many dimensional image placed on a garment or re-moveable or interchangeable garment panel and/or a removable Interactive Video Display Panel (iVDP™).

Addition of an Interactive Video Display Panel™ System (iVDP™), which includes and is not limited to:

A removable iVDP™ that is affixed to the garment utilizing the billboard-type garment/iPOPS™ panel system. iVDP™ is powered by a mobile power source that is embedded into the billboard-type garment and/or the iVDP™ Panel. Source power includes but is not limited to re-chargeable lithium cell or hydrogen fuel cell batteries.

iVDP™ surface may display black and white, or radiant full color video on the screen displaying both still and/or motion picture imagery. In a preferred embodiment, the video screen is implemented by covering the panel portion of the garment and has millions of light-emitting diodes (LED), full-color organic light emitting diode (OLED) video display, electronic paper (E-PAPER) or a combination of the aforementioned display technology and/or any other video display mechanism that are computer controlled. In certain embodiments, the iVDP™ may provide stereoscopic 3D or multi-dimensional images to viewers that are wearing liquid crystal glasses or through wearable head-mounted augmented reality eyepiece hardware connected to wireless devices possessed by viewers, or a combination of these components such as are known in the art. In some cases, a iPOPS™ radio transmission equipment may be used to provide the necessary audio synchronization signal to such liquid crystal glasses or head-mounted augmented reality eyepiece hardware connected to wireless devices possessed by viewers, or a combination of these components.

Under certain circumstances, an iVDP™ System may provide audio as well as video. Audio programming may be delivered to viewers by a iPOPS™'s garment embedded speakers, headphones, ear buds or audio source built in to head-mounted eyepiece hardware.

Addition of Interactive Embedded Radio Frequency Identification (RFID) Tag, which includes but is not limited to:

Embedded Radio Frequency Identification (RFID) Tag within garment or a removable or interchangeable garment panel and/or a removable Interactive Video Display Panel™ (iVDP™); which allows a company to track the location and location history of its personnel within a pre-determined geographical radius that is monitored by a wireless tracking system. The RFID may also help identify an employee from a consumer/civilian.

RFID Tag may also be used in symphony with the iVDP™ for the purpose of being able to remotely switch the content via a wireless network feed. For example, while a person is wearing garment with a combination of a billboard-type garment with iVDP™ and a programmed RFID Tag, the content of transmitted wireless electronic data, images, video to the iVDP™ can be electronically switched based on strategic placement of live or pre-programmed RFID transmitting devices. This may also include simulcast broadcasting as known in the art.

Addition of Atom Chip (AC), which includes but is not limited to:

Embedded Interactive Atom Chip, which communicates in tandem with the iPOPS™ and identifies specific viewer information such as the age, gender, and nationality of one, or a multitude of viewers, and is programmed to determine the specific electronic content to be delivered to the viewer(s) audience.

The AC may also be used in symphony with the iVDP™ and RFID Tags for the purpose of being able to remotely switch the content via a wireless network feed. For example, while a person is wearing a billboard-type garment in conjunction with an iVDP™, a programmed RFID™ Tag and an Atom Chip, the content of transmitted wireless electronic data, images, video or any other electronic information to a iVDP™ can be automatically switched based on the age, gender, and nationality of one, or a multitude of viewers. iPOPS™ AC Technology also allows for transmission of sensitive and relevant consumer data to be stored, retrieved, accessed and displayed on an iPOPS™ Vitalytics™ Dashboard. iPOPS™ AC Technology can automatically collect the time or viewing, and number of viewers, creating an advertising matrix for charging on a pay-per-view platform.

Addition of Interactive Near or Far Frequency Communication (NFC or FFC) Transmitter(s), which includes but is not limited to:

Creating a connection between two chips; one chip installed in a wireless Communication device (for example, a smartphone) and a second chip embedded in a garment that together utilize high-frequency transmissions through the air (wireless) to communicate to each other allowing data, images, sound, wireless transactional data or any other information that may be developed for distribution between the two communication devices.

For Example, with Frequency Communication Transmitters built into the wireless communication devices and the garment (the iVDP™ System), consumers can waive their mobile phones at a Frequency Communication Transmitter (FCT Tag) and obtain context-sensitive information such as product information, wireless coupons, customer loyalty points, discounts or opportunities for consumers to be instantly entered into a contest or utilized as a check out point in the store to pay for purchases directly through the iPOPS™ Garment Network.

Another example of Frequency Communication Transmitter is a wireless Communication device user ("user") utilizing Near Frequency Communication ("NFC") passes by a person that has a Near Frequency Communication transmitter embedded in their garment (pants, shirt, hat, shoes or any other wearable garment including human flesh) that allows the user to receive context-sensitive information that will allow the user to instantly collect information that allows the user to view, research and/or purchase, the garment or other proposed purchase through the transmission (with the embedded transmitter) on demand, in real-time.

Addition of Frictionless Processing that includes but is not limited to:

Frictionless Processing of waving a mobile hand held wireless device in front of an Electronic Communication Transmission Link creating a transfer of data, sound, purchasing or any other context-sensitive information, including and not limited to the process of wireless, frictionless financial transactions between a mobile hand held device and a garment or garment panel.

An example of Frictionless Processing is; instead of picking up a product and taking it to a checkout location and swiping a credit card for purchase, simply wave your mobile wireless device with a Frequency Communication Transmitter installed (that you are already holding) within close proximity of a garment or garment panel and the Frequency Communication Transmitter Tag will deliver the purchase directly to the mobile wireless device for your approval and will instantly process the transaction for in-store or direct to home or office delivery.

Another example is while attending a sporting event, the person delivering beverages, ice cream, snacks, food, beer, etc., to spectators, is wearing an iPOPS™ Garment with an advertisement of a product that may or may not be available at the event (or the spectator does not want to carry the purchase out of the event). By utilizing Frictionless Processing, the spectator may simply wave their mobile wireless device with a Frequency Communication Transmitter installed (that they are already holding) within close proximity of an iPOPS™ Garment and the Frequency Communication Transmitter Tag will deliver the purchase directly to the mobile wireless device for their approval and will instantly process the transaction for on-site or home delivery.

Another example of Frictionless Processing is a wireless mobile handheld device user ("user") utilizing Near Frequency Communication ("NFC") and who passes by a person that has a Near Frequency Communication transmitter embedded in their garment (pants, shirt, hat, shoes or any other wearable garment) that allows the user to receive context information-sensitive data that will allow the user to instantly collect information that allows the user to view, research and purchase products or the like utilize, the garment (with the embedded transmitter).

Addition of Voice Activated Frictionless Processing that includes but is not limited to:

Multi-Lingual Voice Activated Frictionless Processing by communicating to a wireless device through voice activation transmission through an Electronic Communication Transmission Link embedded in a garment or garment panel creating a transfer of data, sound, wearable eyepiece with a HUD Display or any other context information-sensitive information, including and not limited to the process of wireless, frictionless financial transactions between a wireless mobile device and a garment or garment panel.

Addition of Human Flesh or Embedded Frequency Communication Transmitter(s), which includes but is not limited to:

A computer chip embedded into the human flesh that interacts with a wireless device that delivers similar attributes or the same attributes as the iPOPS™ System.

Addition of Visual Recognition Communication (VRC) Technology Processing that includes but is not limited to:

Visual Recognition Communication that transmits a signal between a wireless mobile device and a garment and may or may not include communication with a wearable head-mounted mediated or augmented reality eyepiece hardware. Visual Recognition Communication will rely on visual clues and patterns to identify specific objects and match them with internet content. Visual Recognition Communication allows a user to scan an object or picture through a camera on your mobile hand held device and your device will recognize the object and provide additional information without the assistance of barcodes or Mobile Action Codes ("TAGS"). Visual Recognition Communication Technology does not require the manufacturing of any type of TAG.

An example of VRC Technology would be to scan an image off of a garment or garment panel at a retail outlet and obtain information, video content, coupon or to be directed to make an instant purchase of the item contained in the image directed to the user by the iPOPS™ System provider.

Addition of Interactive Audio Speakers, which includes but is not limited to:

Surface mounted or embedded speakers that work either independently or in symphony with the content being electronically delivered to the iVDP.

Speakers may be mounted on the front, back or sides or a combination of front, back and sides of iPOPS™ Garment.

Speakers may broadcast in mono or stereo format.

Speakers may also be used for an audio transmission to a wireless device to be used for listening.

Addition of Interactive Holographic Image Projection (iHIP) of Images, which includes but is not limited to:

Surface mounted or embedded holographic projector that may be installed into the front, rear or side, or a combination of or front, rear and side of the iPOPS™ Garment.

A example of Interactive Holographic Image Projection images is a retail worker wearing an iPOS System garment walking down a store aisle projecting a holographic image within a designated proximity of the retail worker displaying a multi-dimensional image that the store customer can interact with by having a virtual conversation or by interacting with a wireless device which may include augmented reality scenarios.

Addition of Mobile Power Supply (battery pack), which includes but is not limited to:

A mobile battery pack that can be charged and provide power to many sources built into the iPOPS™ garment or the iVDP™ (or both) to power a Digital Panel(s), audio speaker (s), RFID transmitter(s), Atom Chip(s), Frictionless Transmitter(s), Visual Recognition Processor(s), Holographic Projector(s), Smell Disseminator(s), Data Communication Device(s), Wearable Eyepiece, RFID Transmitters, GPS Device(s), Microphone(s), Earpiece (headphones), Wireless Device(s) (such as a smartphone or tablet) Frequency Communication Transmitter(s) or any other electronic device that works in unison with the iPOPS™ System, individually and/or in unison.

Addition of Virtual Point or Monetary Collection and Processing System (A Virtual Bank) which includes but is not limited to:

Interactivity through a wireless mobile device and garment or garment panel that allows a user to receive electronic information to their wireless communication device from a garment or garment panel that includes a Point or Monetary reward that is collected by the user when interacting with a garment that uses the iPOP's™ System (or any portion thereof). Upon electronic collection of the Points or Monetary reward issued to the user, the Points or Monetary reward is deposited into a virtual electronic collection bank specifically set up for the user that will keep a running account of the Points or Monetary rewards they receive upon each successful transmission(s) interaction(s) between the wireless mobile device and the garment wearer.

At the option of the user, their collection of Points and/or Monetary rewards may be embedded in their social media related website like Facebook™, MySpace™, Twitter, or any other social networking or page that is connected to the internet, Cloud based network or any other network, including and not limited to a website, blog, Application (App) or any other form of electronic information placement as known in the art.

Points or Monetary rewards may be redeemed through the iPOP™ System for tangible or intangible goods or services or monetary rewards.

Addition of Points or Monetary Reward System which includes but is not limited to:

Interactivity with a garment or removable or interchangeable garment panel and a wireless communication device where the user receives virtual points, customer loyalty and/or monetary rewards that are redeemable for goods or services provided through the iPOPS™ System or an iPOPS™ System Provider.

Addition of Interactive Logo placed on or within a garment or removable or inter-changeable garment panel which includes but is not limited to:

Interactivity with a logo or branding on a garment or garment panel that has embedded Mobile Action Codes, TAGS, Frictionless Communication or any wireless transmitter that communicates with a mobile wireless device and connects to the internet, Cloud based, satellite, microwave, or any other wireless electronic information communication delivery system.

Addition of Interactive Gaming System (EI™ Games) which includes but is not limited to:

Addition of an electronic game that combines the use a wireless communication device and a garment, by utilizing a one or many dimensional image (code) placed on a garment or removable or interchangeable garment panel and/or a removable Interactive Electronic Video Display Panel (iVDP™). The gaming may included the user collecting points and/or a monetary reward through a electronic accumulation system (virtual bank) where the user receives points that may be redeemed for products, services, discounts, coupons or any other reward through accumulation of electronic points received.

An example of the Interactive Gaming System (EI™ Games) is where a user utilizes their wireless device (for example a smartphone or tablet) and scans an image of a Mobile Access Code (MAC). The user may then be sent an electronic communication that can give them a point reward for the image scan and may also deliver the user a coupon, customer loyalty incentives, enter them into a contest, play a game or any other interactive proposition or giveaway. The user may repeat this process at many other locations that have participating subscribers of the EI™ Games system allowing them to collect many points from one or many subscribing companies. The user at any point may redeem the points collected to receive a benefit reward from Interactive Gaming or an EI™ Games provider.

Addition of GPS Locator: Tracks employees and allows Security Personnel to track current and past locations of an employee, view their breaks and can differentiate an employee from a consumer or civilian. May also allow users to locate family members while on premise in case family members get lost or separated from one another. Also works as an amber alert system helping in assisting the recovery of a lost or stolen child, linking employees with wireless mobile consumers/civilian together in one network.

Addition of Wireless Mobile Device for access to database for aisle assistance or live customer service link. Plugs into garment audio source. This system allows employees to be connected directly to a live or pre-programmed Data Communication source that can relay any pertinent information that an employee or consumer/civilian may need to know at anytime. For example, this may be related to product information, navigation through the store or product location within a store. May also be used to call internally to other branches of related stores or to distribution warehouses to locate inventory.

Addition of Microphone for communication with virtual service attendant (questions about products) or live customer service or question and answer dialogue with consumer/civilian. This system allows employees to be connected directly to a live or pre-programmed Data Communication source that can relay any pertinent information that an employee or consumer/civilian may need to know at any time. For example, this may be related to product information, navigation through the store or product location within a store. May also be used to call internally to other branches of related stores or to distribution warehouses to locate inventory.

Charger Connector to work with Electronic Garment Charging System. Electronic leads that are embedded into the iPOPS™ Garment that allows for charging and re-charging of the iPOPS™ Garment battery electronic devices and or portable embedded battery power supply packs.

Addition of Data Communication transmitter and receiver system. Works in symphony with or independently of a wireless mobile device. This component is the heart of the distribution of data and communication between the iPOPS™ Network Data Center and the iPOPS™ Garment wearer. It collects and delivers ALL data and communication from all components including but not limited to iVDP™, Digital Panel(s), Audio Speaker(s), RFID transmitter(s), Atom Chip(s), Frictionless Transmitter(s), Visual Recognition Processor(s), Holographic Projector(s), Smell Disseminator(s), Data Communication Device(s), Wearable Eyepiece, RFID Transmitters, GPS Device(s), Microphone(s), Earpiece (headphones), Wireless Device(s) (such as a smartphone or tablet) Frequency Communication Transmitter(s) or any other electronic device that works in unison with the iPOPS™ System, individually and/or in unison. A key component includes the live or pre-recorded communication between the iPOPS™ Garment wearer and the iPOPS™ Network Database. (see [0072] & [0073])

Addition of Scent/Odor disseminator. The odor disseminator is an electronic device that operates in conjunction with the GPS locator and/or the RFID Chip. It has the ability to identify the location of the iPOPS™ Garment in the store or event and emit an odor that is programmed into the disseminator device that relates to a product, location or an event that recognizes pre-programmed sensory olfactory scents based on an advertisers or customers desires at any given time or location. An example may be; as an employee travels throughout the store, the smell disseminator may release the "bread in the oven" smell as the employee travels near the bakery section or a "fresh Irish Spring Soap" scent may be disseminated as the employee travels through the Men's Health and Beauty aisle of the store, based on an advertisers sponsorship, enticing consumers to purchase their branded products that are in the vicinity of the scents that relates specifically to the scent or their product.

Addition of connectivity to wearable eyepiece hardware. The addition of the Eyepiece to the iPOPS™ Garment allows a hands free element to the employees. By wearing a Heads Up Display (HUD) Eyepiece, it allows the employees to communicate with the Data Communication Network and ask and retrieve data in near real-time receiving answers from live or pre-recorded sources that can either give an audio response through the earpiece, headphones or display information within the confines or the eyepiece. For example, as a consumer approaches an employee wearing an iPOPS™ Eyepiece, and the on-garment or Eyepiece microphone picks up a question asked by the consumer and the Data Communication System relays the question back to the iPOPS™ Network and relays the answer back to the employee who then tells the consumer the answer to their question; all communication happens in a matter of seconds. The employee may see the answer to the consumer via the Eyepiece Heads Up Display (HUD) and may also give GPS mapping directions to a specific product location in the store. In addition, the employee may look at a barcode (Data Matrix Code or Multi Dimensional Code or Tag) and the Eyepiece Code (or Tag) Reader can display product information, pricing or access the Data Communication System to access additional specifics about the item being viewed by the eyepiece. The iPOPS™ Eyepiece may contain elements of Visual Recognition Communication which includes and is not limited to mediated or augmented reality components connected to wireless device(s) possessed by iPOPS™ Garment wearer or the consumer/civilian.

Addition of Chroma-Key Panel. The iPOPS™ may also include chroma-key technology to project indicia on the garment that may be viewable from a interactive wearable head-mounted eyepiece with an integrated processor for handling content for display and an integrated image source for introducing the content to an optical assembly through which the user views a surrounding environment and garment indicia through the displayed content in the eyepiece. The addition of Chroma-Key Technology to the iPOPS™ Garment allows for multiple wearers of head-mounted eyepieces with an integrated processor for handling content for display to view completely different indicia on the garment while looking at the garment simultaneously. For example, a consumer in a retail store may have a store branded customer loyalty card stored electronically on his wireless device that connects to the in-store iPOPS™ Network which may pull a consumers shopping list off of their wireless device and display an advertisement of a product listed on his/her wireless device that they have purchased in the past or are intending to purchase that day and will directly relate to that product while in the aisle or vicinity of that product in the store. At the same time, any number of consumers may be looking at the same iVDP™ with Chroma-Key displayed and see the product displayed on the iPOPS™ wearer (employee) that is on their mobile shopping list or is scheduled to purchase in the very near future based on the information the retailer has stored within their mobile customer loyalty shopping card, due to their specific buying habits and patterns.

The invention herein contemplates the addition of Earphone Jack or Wireless Audio Transmitter for use with a plug-in or wireless device to distribute audio through the iPOPS™ Garment, Headphones (earbuds) or Eyepiece with built-in audio earpiece. The iPOPS™ may also include a microphone plug-in jack or wireless transmitter for real-time listening, Bluetooth Technology or any open wireless technology standard for exchanging data over short distances (using short wavelength radio transmissions in the ISM band), earphone plug-in jack for live interaction or recorded communication from a database (that may or may not be connected or used in conjunction with the wearable head-mounted eyepiece), a wireless communication device (such as a mobile phone) that may or may not be connected to the iPOPS™ Interactive Video Display Panel™ and certain embodiments may access a virtual attendant that can provide "real-time" answers to consumer or garment wearer questions; either live or accessed through a computer based network, Cloud based database source, video camera and/or video or atom chip technology and may include a GPS tracking identification device.

The invention contemplates the addition of Battery pack with rechargeable system (attached to Charger Connector). iPOPS™ Garment built-in or embedded connector leads power the cell battery removable and re-chargeable battery pack that powers the iPOPS™ on-garment electronic components that need power assistance.

Referring to FIGS. 1 to 7, a removable billboard panel 8 is shown on a garment 100 as disclosed in U.S. Pat. No. 7,51, 495. Suitable indicia and interactive video is displayed on panel 8 in accordance with the teachings of the invention. A battery power supply 10 may be provided along with a wireless near field communication transmitter 9. One or more mobile action codes 7 may also be provided on panel 8 at suitable locations.

Audio speakers 5 may be provided on the shoulder of the garment on opposite sides of the collar. A cell phone 1 may be disposed in a pocket (not visible) of the garment. Glasses 2 may be worn by the user having suitable hardware and electronic components therein for carrying out the teachings of the invention. A built-in microphone 14 may be provided at the neck portion along with an earpiece plug-in jack and wireless transmitter 13. A wireless transmitter 104 may be embedded in panel 8.

Figure 2:
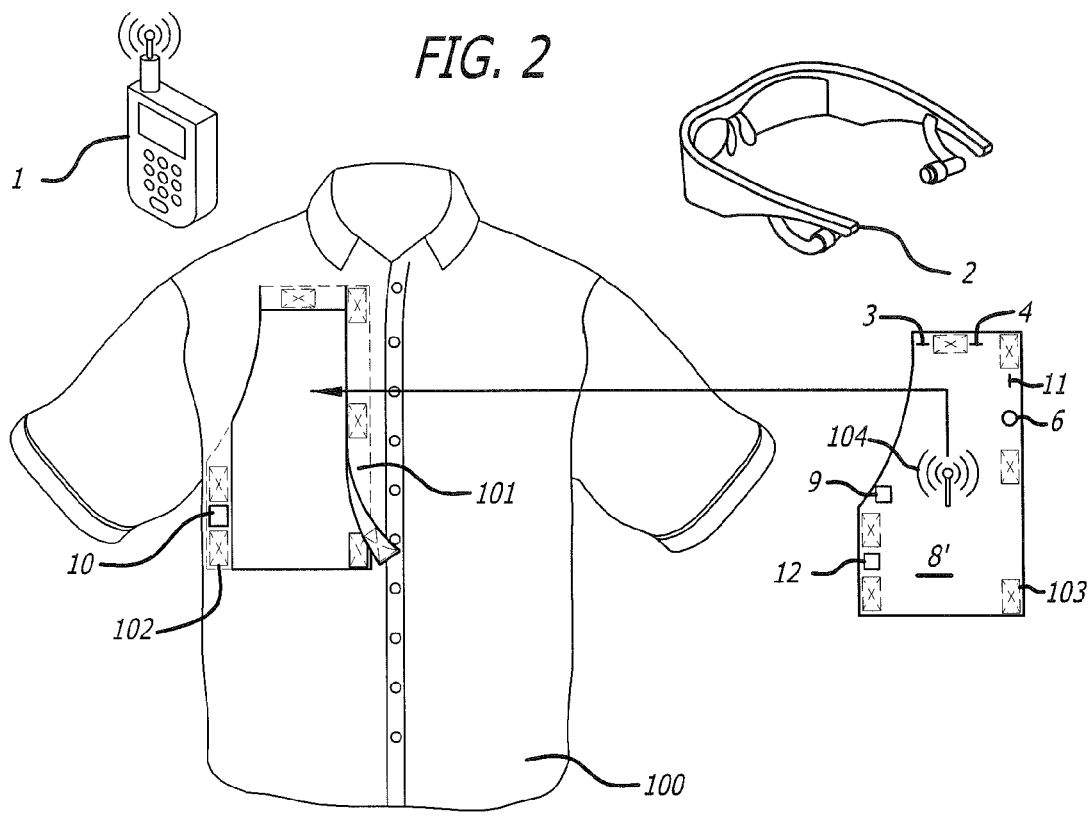
FIG. 2 is an elevational view of the front of a garment with a smaller removable panel than in FIG. 1.

FIG. 2 is similar to FIG. 1 and like numerals refer to like parts of FIG. 1. Here, instead of large panel 8 there is a smaller removable panel $8^1$. It can be seen in FIG. 2 how the flaps or tabs 101 cover one of the mating fastening means 102 which mate with the fastening means 103 on the panel $8^1$.

A data delivery processor and/or transmitter and communication system 3 may be provided on panel $8^1$ along with a GPS locator device and/or RFID transmitter 4. An atom chip transmitter 11 may also be provided on panel $8^1$ along with a holographic projector and/or video camera 6. A connector 12 is provided on panel $8^1$ adapted to electronically connect to power source 10 on garment 100.

Figure 3:
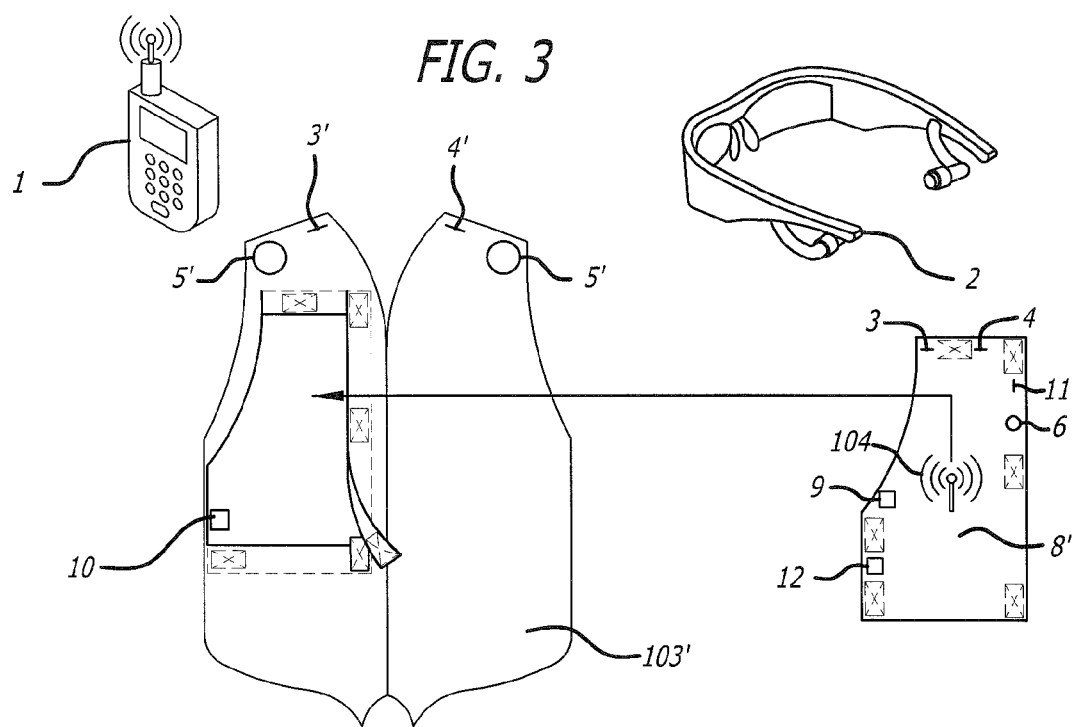
FIG. 3 is an exploded view of a vest similar to the garments of FIGS. 1 and 2 showing a panel removed from the main body of the vest.

A vest $103^1$ is shown in FIG. 3. Again, like numerals refer to like parts of FIGS. 1 and 2. The speakers $5^1$ are on the vest $103^1$. The system 3 and transmitter 4 on panel $8^1$ in FIG. 2 may be placed on vest 103 at top as data delivery processor/transmitter and communications system $3^1$ and GPS locator and/or RFID transmitter 4. Speakers $5^1$ are identical to speakers 5 of FIG. 1.

Figure 4:
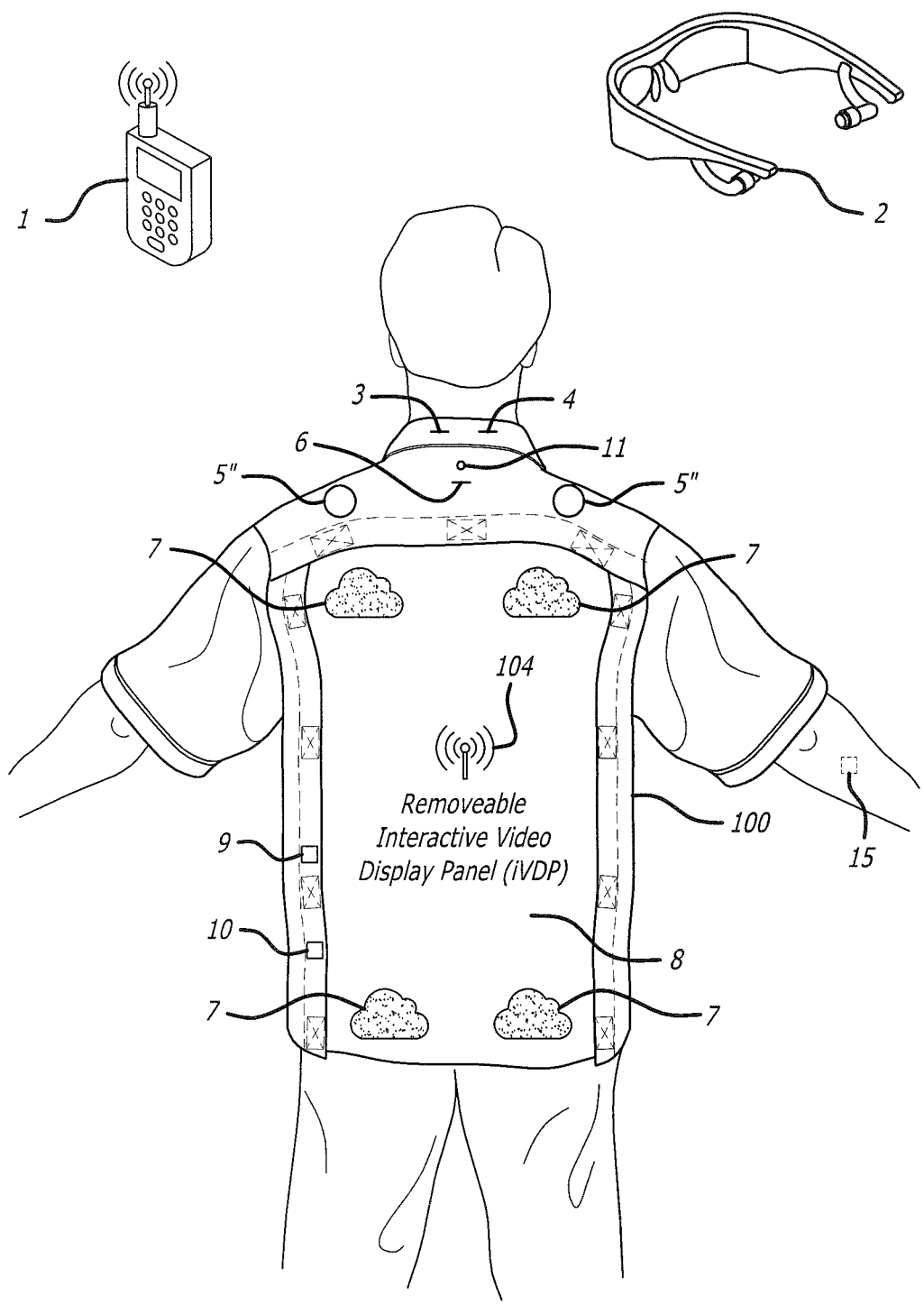
FIG. 4 is a rear elevational view of the garment of FIG. 1.

FIG. 4 is a rear view of the garment of FIG. 1 having a similar removable panel 8, like numerals referring to like parts of FIGS. 1-3. That is, panel 8 may be disposed on either the front of a garment, as in FIG. 1, or on the rear, as in FIG. 4. Speakers 5 11 may be disposed on the rear as shown (identical to speakers 5 in FIG. 1) along with transmitter 9 and battery power supply 10. A microchip 15 seen in dotted lines, may be embedded in the arm of the wearer of the garment 100 which would interact with a wireless device to deliver information similar to the system disclosed herein.

Figure 5:
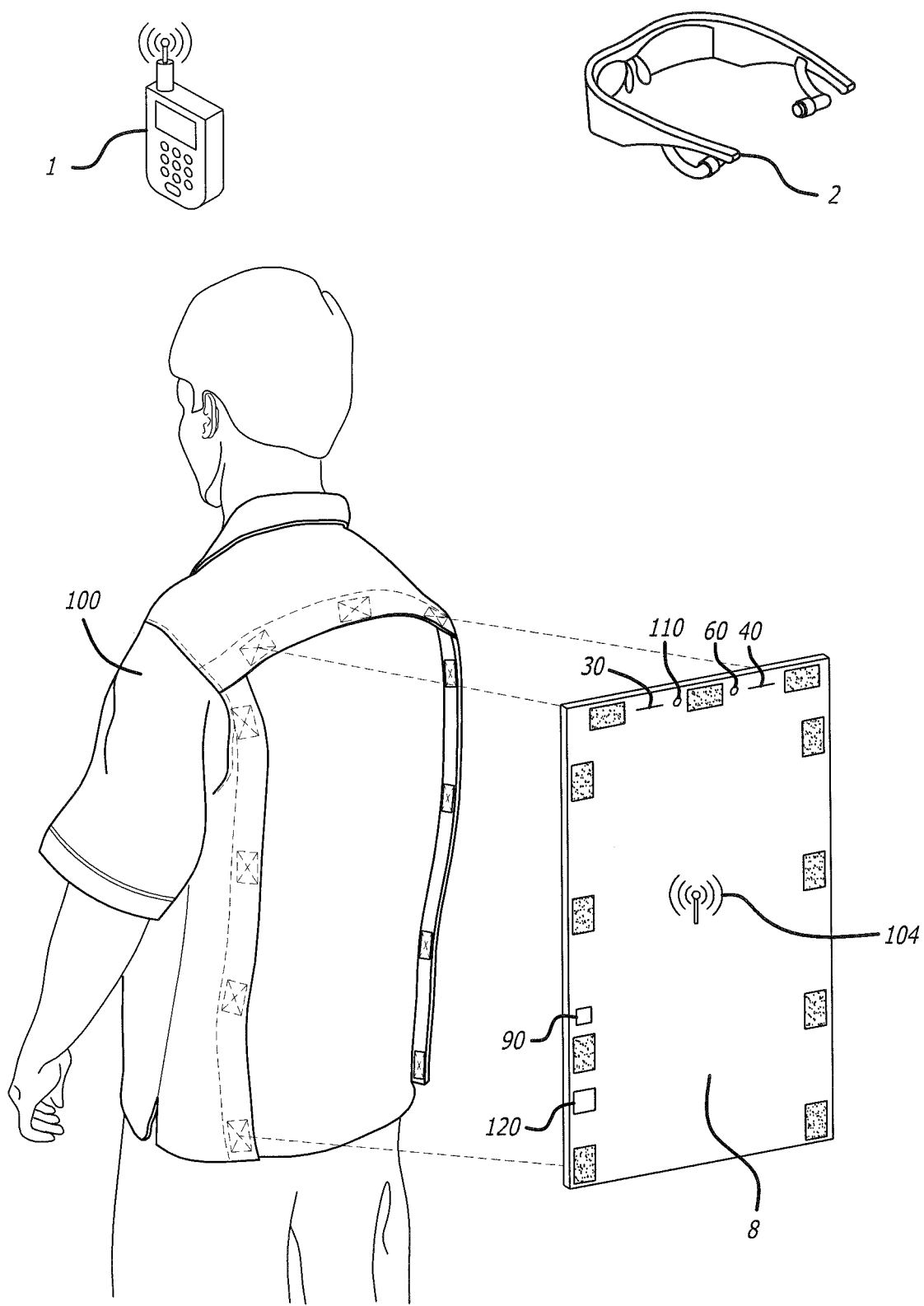
FIG. 5 is an exploded rear elevational view of a garment similar to the garment in FIG. 4 showing a digital electronic panel removed from the main body of the garment.

Alternative locations for the various components are illustrated in FIG. 5. Here; again like numerals refer to like numerals of FIGS. 1 to 4. Thus, devices 30, 60, 110, 40, 90 and 120 are located on panel 8 and identical to aforementioned devices 3, 6, 11, 4, 9 and 12, respectively.

Figure 6:
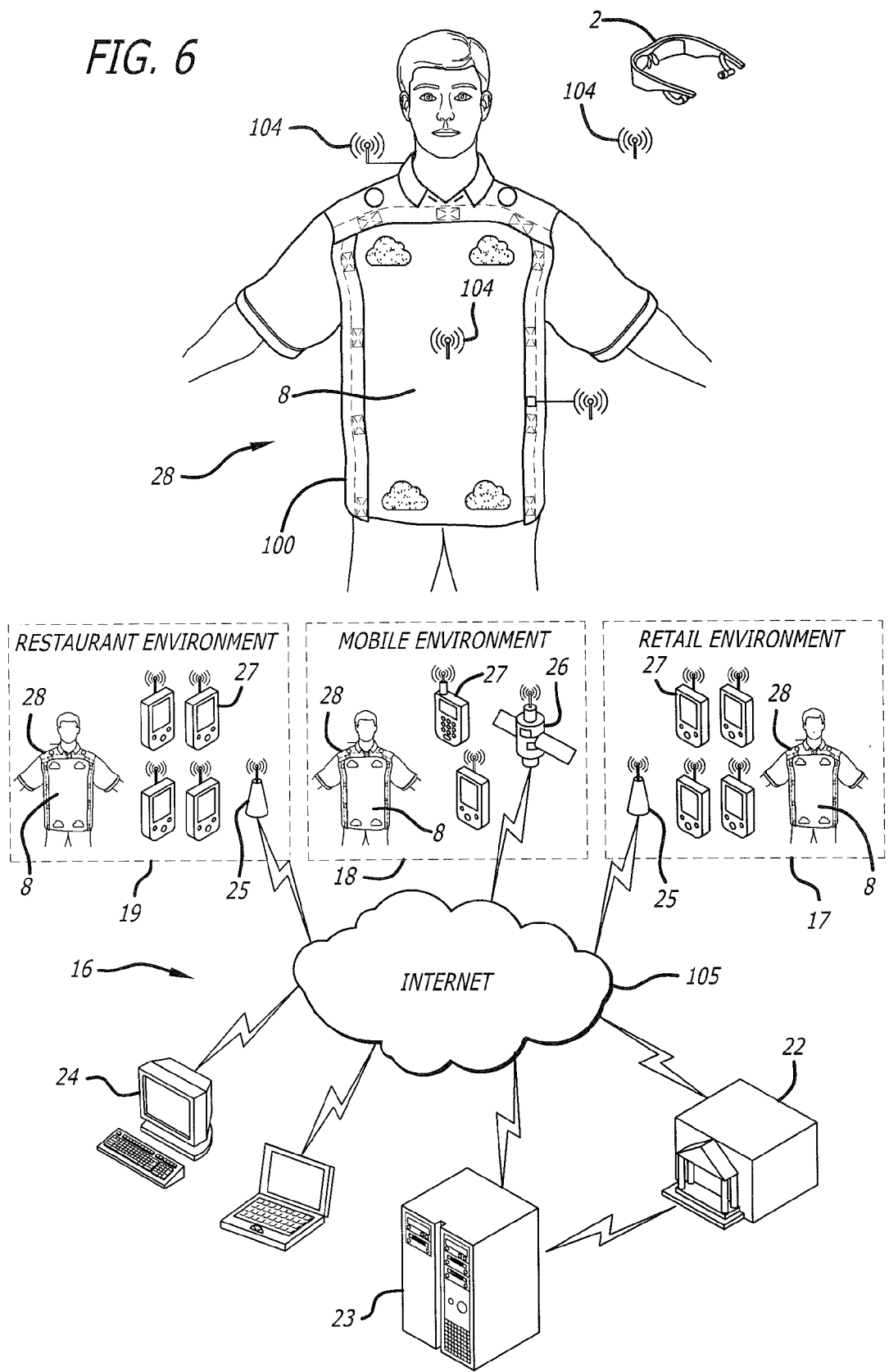
FIGS. 6 and 7 are exploded views illustrating the use of the garment of FIGS. 1 to 5 in an internet environment.

The garment in FIG. 6 is similar to that of FIG. 1, so again like numerals refer to like parts of FIGS. 1 to 5. Not all of the various components are shown in FIG. 6. A wireless transmitter 104 may be provided on the collar of garment 100 and a similar wireless transmitter 104 is mounted in glasses 2. The wearer thus can communicate with the retail establishment 17, a mobile environment 18 or a restaurant environment 19. The user and the three environments 17 to 19 are thus connected to the internet 105 which is connected to various offsite or remote users 24, a home 22, a power center 23, etc.

The signals from the internet 105 may be picked up at the retail environment 17 by a user 28, a mobile phone 27, a base station 25, etc. In the mobile environment, the internet signals from the internet 105 may be picked up by a mobile base station 26, a user 28, a mobile phone 27, etc.

Finally, the signals from the internet 105 may be picked up by the user 28, by the mobile phone 27, and the base station 25 in the restaurant environment 19. The user 28 illustrated herein is wearing billboard panel 8 with its interactive video display in communication with the various environments in accordance with the teachings of the invention.

Figure 7:
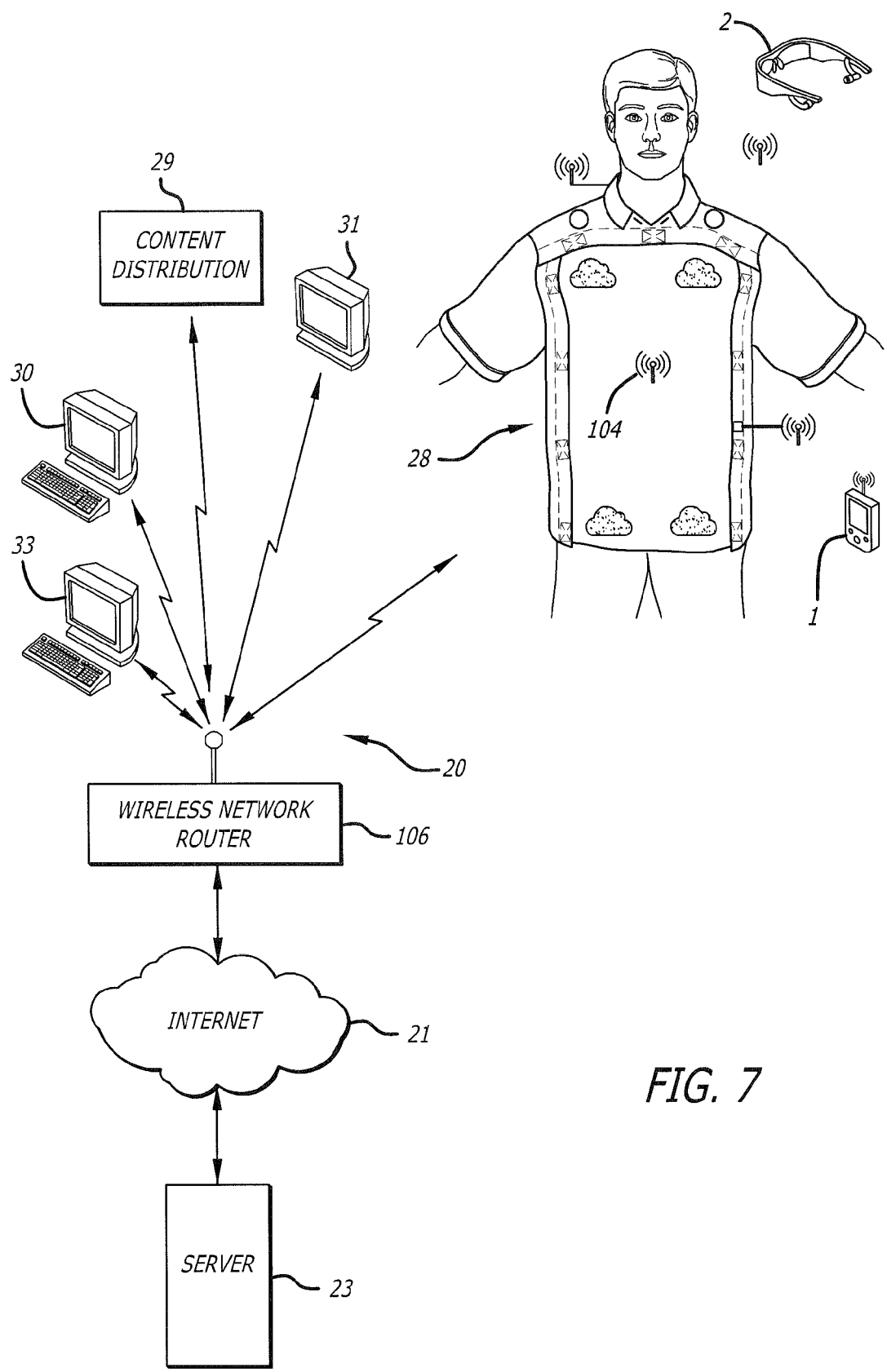

The user 28 in FIG. 6 is shown in FIG. 7 in a suggested Internet set up 20. The user 28 is in wireless communication with a wireless network router 106 connected to the internet 21 which is in wireless communication with a server 23. The router 106 is in wireless communication with a content distribution center 29 and one or more computer base stations 30, 31, 33 which may be in wireless communication with router 106 for carrying out the teachings of the invention.

Although a number of devices are illustrated in FIGS. 1 to 7 located on the panel or garment, not all may be present on all embodiments. Also, the various devices may be provided at differing locations and visible or not visible, as desired.

Although removable panels are disclosed, obviously the devices may be provided on the garment at any suitable location.

Although a specific embodiment of the invention is disclosed, variations thereof may occur to an artisan and the scope of the invention should only be limited by the scope of the appended claims.

The invention claimed is:

1. A billboard garment that can be worn by a first entity, the billboard garment providing an interactive point of purchase system comprising:
    a removable video display screen attachable to a display panel of a billboard garment;
    one or more cameras;
    a receiver interface for capturing environmental data in the proximity of the billboard garment;
    a processor for processing images received on the one or more cameras to obtain demographic information for the environmental data;
    a content interface through which the displayed content of the billboard garment is obtained and, in response to the environmental data, the billboard garment obtaining updated information over the content interface to display, wherein the updated information comprises information pertinent to the demographic information; and
    a power generating apparatus located within the billboard garment providing power needs of the interactive point of purchase system.

2. The billboard garment of claim 1, wherein the billboard garment includes at least one microphone for the receiver interface for capturing environmental data and, the environmental data is a question from a second entity, and the updated information comprises information pertinent to the question.

3. The billboard garment of claim 2, wherein the billboard garment further includes and interfaces to a headset with earphones and, the headset being worn by the first entity and the updated information is in the form of audio delivered to the headset to enable the first entity to answer the question of the second entity in near real time.

4. The billboard garment of claim 1, wherein the billboard garment further includes at least one microphone for the receiver interface for capturing environmental data and at least one speaker, and the environmental data is a question from a second entity, and the updated information comprises audio and or video information pertinent to the question.

5. The billboard garment of claim 1, wherein the demographic information includes identifying the age of entities in the proximity of the billboard garment.

6. A billboard garment that can be worn by a first entity, the billboard garment providing an interactive point of purchase system comprising:
    a removable video display screen attachable to a display panel of a billboard garment;
    a receiver interface for capturing environmental data in the proximity of the billboard garment;

a content interface through which the displayed content of the billboard garment is obtained and, in response the environmental data, the billboard garment obtaining updated information over the content interface that is pertinent to the environmental data; and power generating apparatus located within the billboard garment providing power needs of the interactive point of purchase system, wherein the environmental data includes demographic information identifying the age and race of entities in the proximity of the billboard garment and the updated information comprises an advertisement directed towards the demographic information.

7. The billboard garment of claim 6, wherein said display screen displays three-dimensional images.

8. The billboard garment of claim 6, wherein said display screen displays multiple-dimensional Mobile Access Code images.

9. The billboard garment of claim 6, wherein the billboard garment further comprises one or more video cameras thereby generating video content.

10. The billboard garment of claim 9, further comprising at least one speaker for delivering audio content to the billboard garment's surroundings.

11. A billboard garment that can be worn by a first entity, the billboard garment providing an interactive point of purchase system comprising:
   a removable video display screen attachable to a display panel of a billboard garment;
   one or more video cameras thereby generating video content;
   at least one speaker for delivering audio content to the billboard garment's surrounding;
   a receiver interface for capturing environmental data in the proximity of the billboard garment;
   a content interface through which the displayed content of the billboard garment is obtained and, in response the environmental data, the billboard garment obtaining updated information over the content interface that is pertinent to the environmental data;
   a transceiver for receiving content from a remote location for displaying said content on the display screen or relaying information to a wireless device; and
   a power generating apparatus located within the Billboard Garment providing power needs of the interactive point of purchase system.

12. A billboard garment that can be worn by a first entity, the billboard garment providing an interactive point of purchase system comprising:
   a removable video display screen attachable to a display panel of a billboard garment;
   one or more video cameras thereby generating video content;
   at least one speaker for delivering audio content to the billboard garment's surrounding;
   a receiver interface for capturing environmental data in the proximity of the billboard garment;
   a content interface through which the displayed content of the billboard garment is obtained and, in response the environmental data, the billboard garment obtaining updated information over the content interface that is pertinent to the environmental data;
   a transceiver for transmitting content received from said video cameras to a remote location; and
   a power generating apparatus located within the Billboard Garment providing power needs of the interactive point of purchase system.

13. The billboard garment of claim 12, including transmitting means for transmitting the audio content to one or more portable wireless receiver devices.

14. The billboard garment of claim 12, further including transmitting means for transmitting said video content from said video cameras via satellite.

15. The billboard garment of claim 12, further including transmitting means for transmitting said video content from said video cameras via conventional radio signals and wireless transmission frequencies.

16. The billboard garment of claim 12, wherein said garment includes a frictionless communication chip that allows a wireless device to communicate with said garment.

17. The billboard garment of claim 12, wherein said garment includes a tracking device to track the whereabouts of a person wearing said garment.

18. A billboard garment that can be worn by a first entity, the billboard garment providing an interactive point of purchase system comprising:
   a removable video display screen attachable to a display panel of a billboard garment;
   one or more video cameras thereby generating video content;
   at least one speaker for delivering audio content to the billboard garment's surrounding;
   a receiver interface for capturing environmental data in the proximity of the billboard garment;
   visual recognition technology means in the billboard garment for translating an image obtained in the proximity of the billboard garment into the environmental data;
   a content interface through which the displayed content of the billboard garment is obtained and, in response the environmental data, the billboard garment obtaining updated information over the content interface that is pertinent to the environmental data; and
   a power generating apparatus located within the Billboard Garment providing power needs of the interactive point of purchase system.

19. The billboard garment of claim 18, wherein said garment includes a holographic projector that projects a multi-dimensional image in the proximity of a wearer of said garment.

20. The billboard garment of claim 18, including a monetary/point collection system on said garment that comprises a wireless communication system for collecting, aggregating and redemption of reward points collected by the wearer of said garment.

21. The billboard garment of claim 18, further including placing a company logo on said garment, the company logo including a Mobile Access Code that allows a wireless device to be directed to the internet or other electronic transmission point.

* * * * *